(12) United States Patent
Ehrmann et al.

(10) Patent No.: US 8,153,264 B2
(45) Date of Patent: Apr. 10, 2012

(54) SURFACE COVERING WHICH IS HARDENED IN SEVERAL STAGES

(75) Inventors: Elke Ehrmann, Karlsruhe (DE); Jens Fandrey, Pforzheim (DE); Michael Fahrländer, Stutensee (DE); Klaus Becker-Weimann, Karlsruhe (DE)

(73) Assignee: Klebchemie M.G. Becker GmbH & Co. KG, Weingarten/Baden (DE)

( * ) Notice: Subject to any disclaimer, the term of this patent is extended or adjusted under 35 U.S.C. 154(b) by 73 days.

(21) Appl. No.: 11/918,074

(22) PCT Filed: Apr. 7, 2006

(86) PCT No.: PCT/EP2006/061436
§ 371 (c)(1),
(2), (4) Date: Dec. 17, 2007

(87) PCT Pub. No.: WO2006/106143
PCT Pub. Date: Oct. 12, 2006

(65) Prior Publication Data
US 2009/0022984 A1   Jan. 22, 2009

(30) Foreign Application Priority Data
Apr. 8, 2005   (DE) .......... 10 2005 016 516

(51) Int. Cl.
*B32B 27/40* (2006.01)
*C08F 2/46* (2006.01)

(52) U.S. Cl. ......... 428/425.1; 428/425.8; 428/457; 427/487

(58) Field of Classification Search ....... 428/425.1, 428/425.8, 457, 423.1; 427/487
See application file for complete search history.

(56) References Cited

U.S. PATENT DOCUMENTS

| | | | |
|---|---|---|---|
| 4,173,682 A | | 11/1979 | Noomen et al. |
| 4,321,307 A | * | 3/1982 | Bragole et al. ............. 428/423.1 |
| 4,598,009 A | | 7/1986 | Christie et al. |
| 5,478,427 A | | 12/1995 | Huver et al. |
| 6,180,172 B1 | * | 1/2001 | Hasenkamp et al. ......... 427/277 |
| 6,482,869 B1 | | 11/2002 | Bolte et al. |
| 6,641,911 B1 | | 11/2003 | Puerkner et al. |
| 2002/2157780 | | 10/2002 | Onusseit |
| 2004/0010076 A1 | | 1/2004 | Sugiyama et al. |
| 2004/0250906 A1 | * | 12/2004 | Becker-Weimann et al. 144/332 |
| 2005/0255250 A1 | * | 11/2005 | Becker-Weimann et al. 427/377 |

FOREIGN PATENT DOCUMENTS

| | | |
|---|---|---|
| DE | 19543901 | 5/1996 |
| DE | 198 06 136 A1 | 8/1998 |
| DE | 19853813 | 6/1999 |
| DE | 19800676 | 7/1999 |
| EP | 0 175 474 | 3/1986 |
| WO | WO 9211335 | 7/1992 |
| WO | WO-98/40225 A1 | 9/1998 |
| WO | WO 01/12691 A | 2/2001 |
| WO | WO-02/094457 A2 | 11/2002 |
| WO | WO-02/094549 A2 | 11/2002 |

* cited by examiner

*Primary Examiner* — Thao T. Tran
(74) *Attorney, Agent, or Firm* — Birch, Stewart, Kolasch & Birch, LLP

(57) ABSTRACT

The invention relates to a method of sealing at least part of the surface of an article, comprising the steps of
(a) applying a layer of a radiation-curable melt based on a moisture-crosslinking polyurethane to at least part of the surface of the article, and
(b) irradiating the melt layer.
The invention further relates to article surfaces sealed in this way, and also to the use of the abovementioned melt for surface sealing.

17 Claims, No Drawings

SURFACE COVERING WHICH IS HARDENED IN SEVERAL STAGES

The present invention relates to a method of sealing surfaces of articles, to articles having such sealed surfaces, and to the use of melts for sealing the surface.

In a very wide variety of fields of application at the present time, coating materials are used as a sealing layer on the surface of articles in large quantities, such as in the furniture and wood processing industries.

Widespread coating systems in this context are UV-curing coating materials, which are applied mostly by roller, more rarely by spraying, to the parts. The subsequent curing operation takes place with UV light or UV lamps. The mechanical complexity associated with coating with UV coating materials is very high and necessitates a very large amount of space. Another reason for the large amount of space required is that coating operations with UV-curing systems usually necessitate a plurality of applications—in practice, three to four applications are commonplace. With each application of coating material it is possible per operation to apply layers only about 10 to 20 µm thick, because of the viscosity, but also, especially, because of the UV curing through volume, which is why, generally speaking, two or more applications of coating material are required.

Other coating systems as well, such as 2-component PU coating materials, nitro lacquers or water-based coating materials, for example, must likewise be applied in two or more layers. Additionally, surfacers, primers and, where appropriate, sanding operations in between are usually necessary here.

Advantages associated with coating materials, however, are that they can dry relatively quickly and thereafter have a high moisture resistance and resistance to cleaning products.

Owing to the necessity of multi-layer application of the layers of coating material, methods of sealing have been looked for that allow the sealing layer to be applied to an article in, as far as possible, one operation.

From DE 198 06 136 C2 it is known, in the case of a floorboard for wood-block flooring, having at least one wood layer and a sealing layer on its surface, to configure the sealing layer as a water-free and solvent-free reactive, polyurethane-based melt layer which cures with atmospheric humidity. In that case the reactive melt layer is applied to the wood layer by knife coating, rolling or spraying.

WO-A 02/094549 and WO-A 02/094457 also propose a reactive, polyurethane-based melt layer for sealing a veneer or a furniture component. In these cases the melt layer is smoothed using a roll, for example, in order to obtain a homogeneous surface. So that the melt does not stick to the roll in the course of the smoothing operation, the roll surface is provided with a release agent based on paraffin wax.

The advantage of the melt layer is that the desired layer thicknesses can be applied in a single operation. Moreover, the cured melt still affords sufficient flexibility to prevent the formation of brittle cracks.

A disadvantage associated with the use of the reactive melts, however, is the long residence time before the crosslinking and hence the complete curing are at an end. This time is generally a number of days, during which options for the further processing or packing of the sealed articles are limited.

It is therefore an object of the present invention to provide an improved method of sealing that at least in part avoids the disadvantages outlined above.

This object is achieved by means of a method of sealing at least part of the surface of an article, comprising the steps of (a) applying a layer of a radiation-curable melt based on a moisture-crosslinking polyurethane to at least part of the surface of the article, and
(b) irradiating the melt layer.

It has been found that, through the irradiation of the irradiation-curable components in the PU melt, it is possible to generate an initial sealing strength which allows further treatment and, furthermore, that complete curing of the melt takes place through the typical exposure of the melt layer to moisture. In this case it is possible to obtain a surface coating with multi-stage curing for the sealing of a surface, but one which avoids the application of a plurality of layers or the multi-ply application of one layer.

The irradiation involved is, for example, electron beam or UV irradiation. Preference is given to UV irradiation.

The present invention further provides an article having a sealing layer on at least part of its surface, comprising a layer of a radiation-curable melt based on a moisture-crosslinking polyurethane.

In respect of the polyurethane fraction that forms the basis of the melt, the radiation-curable or radiation-reactive, polyurethane-based melt (also referred to for simplification below as reactive melt) is preferably a commercially customary polyurethane-based reactive melt which reacts normally with the aid of the moisture that is present in the ambient air and, in so doing, cures. Preferably, this reactive melt is solvent-free.

The melting range of the melt begins preferably at 50° C., more preferably at 75° C. and with particular preference at 100° C.

The preferably solvent-free reactive melt layer is typically applied to the area to be sealed at a temperature of at least 100° C., for instance 100° C. to 160° C., preferably 120° C. to 150° C. Here it is normally possible to apply about 20 to 170 g of reactive melt per square meter of surface to be coated. The reactive melt is solid at room temperature and typically possesses a density of about 1.1 g/m$^2$ and a Brookfield viscosity at 120° C. in the range from about 1000 mPas to about 50 000 mPas, preferably 4000 mPas to 10 000 mPas.

The layer, for example, can be knife-coated on, rolled out, sprayed on or applied by means of a slot die or other die. Preference is given to application by rolling.

In addition it is preferred that the surface of the melt layer is smoothed. This can be done, for example, by means of a smoothing strip or a calender roll.

Even in the cured state, the reactive melt layer still has a certain residual elasticity.

The reactive melt layer preferably has a thickness in the range from 5 µm to 200 µm, more preferably from 20 µm to 200 µm, with particular preference from 80 µm to 120 µm.

Owing to the physical properties of the reactive melt, a thickness of this kind can be produced by single application. The layer is therefore produced in a single ply. Since even this, among other things, represents an advantageous time saving, the single-ply application is preferred in the context of the present invention. Multi-ply application, however, is likewise possible. It is also possible to apply a further layer, such as a varnish layer, for example, to the melt layer.

In respect of the reactive melt based on a moisture-crosslinking polyurethane for the method of the invention and for the article of the invention having such a layer, it has surprisingly emerged that suitability is possessed by PU hot-melt adhesives based on starting materials of the kind described in WO-A 01/12691 and intended, following polymerization, for the bonding of book blocks which are rounded in-line.

For example, therefore, the reactive melt based on a moisture-crosslinking polyurethane for the method of the invention and for the article of the invention having such a layer may be a hot-melt adhesive of the kind disclosed in WO-A 01/12691.

Accordingly the chemical basis of the radiation-curable melt based on a moisture-crosslinking polyurethane is preferably like that described in WO-A 98/40225. Hence the radiation-reactive melt based on a moisture-crosslinking polyurethane preferably comprises an electron- or UV radiation-polymerizable component, a photoinitiator, and, where appropriate, additives.

The reactive melt based on a moisture-crosslinking polyurethane preferably comprises, prior to curing, at least one irradiation-polymerizable functional group and also NCO groups.

Preference is given here in the context of the present invention to olefinically unsaturated double bonds as radiation-polymerizable functional groups, of the kind present, for example, in the derivatives of acrylic acid or of styrene prior to curing.

Particularly suitable and preferred in the context of the present invention are the derivatives of acrylic acid, examples being the acrylates and the methacrylates having 1 to 16, preferably 1 to 4 C atoms in the alcohol component.

The reactive melt is solid at room temperature and in accordance with the present invention can be obtained by reacting 1.) one or more polyisocyanates with
2.) at least one polyol and
3.) at least one compound containing UV- or electron-irradiation-polymerizable group, preferably a compound which additionally contains isocyanate-reactive groups,
4.) an initiator if desired, and
5.) additives if desired, such as stabilizers, plasticizers, adhesion promoters, fillers, matting agents and the like.

A useful polyol is, for example, a polymer selected from the group consisting of polyesters, polyethers, polycarbonates and polyacetals, that has a molecular weight (Mn) of at least about 200, or mixtures of two or more thereof. The polyols preferably have terminal OH groups.

Polyols based on polyesters can be obtained, in a manner known to the person skilled in the art, by polycondensation of acid components and alcohol components, more particularly by polycondensation of a polycarboxylic acid or of a mixture of two or more polycarboxylic acids and a polyol or a mixture of two or more polyols.

Polyester-based polyols may be liquidly amorphous or else crystalline.

Polycarboxylic acids suitable for preparing the polyester-based polyols may be constructed around an aliphatic, cycloaliphatic, araliphatic, aromatic or heterocyclic parent structure and may if appropriate, in addition to the at least two carboxylic acid groups, also have one or more substituents which are non-reactive in a polycondensation, such as halogen atoms or olefinically unsaturated double bonds, for example. Where appropriate, in place of the free carboxylic acids, it is also possible to employ their anhydrides (where they exist), or their esters with $C_{1-5}$ monoalcohols, or mixtures of two or more of these, for the polycondensation. Suitable polycarboxylic acids and anhydrides are, for example, succinic acid, adipic acid, suberic acid, azelaic acid, sebacic acid, glutaric acid, glutaric anhydride, phthalic acid, isophthalic acid, terephthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acids or trimer fatty acids or mixtures of two or more thereof. If appropriate it is possible for there to be minor amounts of monofunctional fatty acids in the reaction mixture.

As diols for preparing the polyesters or the polycarbonates it is possible to employ a multiplicity of polyols. These are, for example, aliphatic polyols having 2 to 4 OH groups per molecule. The OH groups may have both primary and secondary attachment. The suitable aliphatic polyols include, for example, ethylene glycol, propane-1,2-diol, propane-1,3-diol, butane-1,4-diol, butane-1,3-diol, butane-2,3-diol, butene-1,4-diol, butyne-1,4-diol, pentane-1,5-diol, and also the isomeric pentanediols, pentenediols or pentynediols or mixtures of two or more thereof, hexane-1,6-diol, and also the isomeric hexanediols, hexenediols or hexynediols or mixtures of two or more thereof, heptane-1,7-diol and also the isomeric heptane-, heptene- or heptyne-diols, octane-1,8-diol and also the isomeric octane-, octene- or octyne-diols, and the higher homologues or isomers of the specified compound, of the kind which result from a stepwise prolongation of the hydrocarbon chain by one $CH_2$ group in each case, or by introducing branches into the carbon chain, or mixtures of two or more of these. Likewise suitable are alcohols of higher functionality such as, for example, glycerol, trimethylolpropane, pentaerythritol or sugar alcohols such as sorbitol or glucose, and also oligomeric ethers of the stated substances with themselves, or in a mixture of two or more of the stated compounds with one another, an example being polyglycerol having a degree of polymerization of about 2 to about 4. In the alcohols of higher functionality, one or more OH groups may have been esterified with monofunctional carboxylic acids having 1 to about 20 C atoms, with the proviso that there are on average at least two OH groups still remaining. The stated alcohols of higher functionality can be employed in pure form or, where possible, in the form of the technical mixtures obtainable in their synthesis.

Examples of polyesters suitable as polyols include the Dynacoll products available from Degussa. The molecular weight of the polyols which can be employed as polyesters is between 1000 and 10 000 g/mol, more preferably between 2000 and 6000 g/mol.

Preference is given in the context of the invention to using crystalline and amorphous polyesters, since with these polyesters it is possible to achieve very short open times and a rapid freedom from blocking.

Likewise suitable as polyols are polyether polyols. Polyether polyols are obtained typically by reaction of a starter compound having at least two reactive hydrogen atoms with alkylene oxides or with arylene oxides, examples being ethylene oxide, propylene oxide, butylene oxide, styrene oxide, tetrahydrofuran or epichlorohydrin or mixtures of two or more thereof. Examples of suitable starter compounds are water, ethylene glycol, propylene 1,2-glycol or 1,3-glycol, butylene 1,4-glycol or 1,3-glycol, hexane-1,6-diol, octane-1,8-diol, neopentyl glycol, 1,4-hydroxymethyl-cyclohexane, 2-methyl-1,3-propanediol, glycerol, trimethylolpropane, hexane-1,2,6-triol, butane-1,2,4-triol, trimethylolethane, pentaerythritol, mannitol, sorbitol, methylglycosides, sugars, phenol, isononylphenol, resorcinol, hydroquinone, 1,2,2- or 1,1,2-tris(hydroxyphenyl)ethane, ammonia, methylamine, ethylenediamine, tetra- or hexamethylenamine, triethanolamine, aniline, phenylenediamine, 2,4- and 2,6-diaminotoluene and polyphenylpolymethylenepoly-amines of the kind obtainable through aniline-formaldehyde condensation. Particularly suitable in this respect are polypropylene glycols having a molecular weight of about 250 to about 4000.

Likewise suitable as polyols are polyacetals. Polyacetals are compounds of the kind obtainable by reacting glycols, diethylene glycol or hexanediol for example, with formaldehyde. Polyacetals useful in the context of the invention can also be obtained by polymerizing cyclic acetals.

Additionally useful as polyols are polycarbonates. Polycarbonates can be obtained, for example, by reacting the abovementioned polyols, more particularly diols such as propylene glycol, butane-1,4-diol or hexane-1,6-diol, diethylene glycol, triethylene glycol or tetraethylene glycol, or mixtures of two or more thereof, with diaryl carbonates, diphenyl carbonate for example, or phosgene.

Likewise suitable as polyols are polyacrylates which carry OH groups. Polyacrylates of this kind are obtainable, for example, by polymerizing ethylenically unsaturated monomers which carry OH groups. Such monomers are obtainable, for example, through the esterification of ethylenically unsaturated carboxylic acids and difunctional alcohols, the alcohol being present generally only in a slight excess. Examples of ethylenically unsaturated carboxylic acids suitable for this purpose include acrylic acid, methacrylic acid, crotonic acid or maleic acid. Examples of corresponding esters carrying OH groups include 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxy-propyl methacrylate or mixtures of two or more thereof.

Polyisocyanates suitable for reaction with the polyols contain on average two up to a maximum of about four isocyanate groups. Examples of suitable isocyanates are 1,5-naphthalene diisocyanate, 4,4'-diphenylmethane diisocyanate (MDI), hydrogenated MDI (dicyclohexyl-methane diisocyanate, H12-MDI), xylylene diisocyanate (XDI), tetramethylxylylene diisocyanate (TMXDI), 4,4'-diphenyldimethylmethane diisocyanate and also di- and tetraalkyldiphenylmethane diisocyanate, 4,4'-dibenzyl diisocyanate, 1,3-phenylene diisocyanate, 1,4-phenylene diisocyanate, 2,4- and 2,6-tolylene diisocyanate (TDI) and mixtures thereof, more particularly a mixture containing about 20% 2,4- and 80% by weight 2,6-tolylene diisocyanate, and also TDI uretdiones, more particularly dimeric 1-methyl-2,4-phenylene diisocyanate (TDI-U), and TDI-ureas; 1-methyl-2,4-diisocyanatocyclohexane, 1,6-diisocyanato-2,2,4-trimethylhexane, 1,6-diisocyanato-2,4,4-trimethylhexane, 1-isocyanato-3-isocyanatomethyl-3,5,5-trimethylcyclohexane (IPDI) and its isomers and derivatives, particularly dimers, trimers and polymers, and also IPDI isocyanurate (IPDI-T), chlorinated and brominated diisocyanates, phosphorus-containing diisocyanates, 4,4'-diisocyanatophenylperfluoroethane, tetramethoxy-butane 1,4-diisocyanate, 1,4-butane diisocyanate, 1,6-hexane diisocyanate (HDI), cyclohexane 1,4-diisocyanate, ethylene diisocyanate, bisisocyanatoethyl phthalate; polyisocyanates containing reactive halogen atoms, such as 1-chloromethylphenyl 2,4-diisocyanate, 1-bromoethylphenyl 2,6-diisocyanate, 3,3-bischloro-methyl ether 4,4'-diphenyldiisocyanate. Also useful are sulphur-containing polyisocyanates, of the kind obtainable for example by reaction of 2 mol of hexamethylene diisocyanate with 1 mol of thiodiglycol or dihydroxydihexyl sulphide. Other diisocyanates are trimethylhexamethylene diisocyanates, 1,4-diisocyanato-butane, 1,2-diisocyanatododecane and dimer fatty acid diisocyanates.

Particular preference is given in the context of the present invention to aliphatic isocyanates such as IPDI, HDI, TMXDI and H12-MDI and their derivatives. As polyisocyanates it is also possible to use prepolymers, i.e. reaction products of abovementioned isocyanates with abovementioned polyether polyols. These prepolymers are prepared by reacting the abovementioned polyether polyols with an excess of the abovementioned polyisocyanate in the known way. As polyether polyol components it is preferred to use polyethylene oxides and polypropylene oxides.

In the context of the present invention the aforementioned polyisocyanates can be used individually or as a mixture of two or more of the stated polyisocyanates. It is preferred in the context of the present invention to use a single polyisocyanate or a mixture of two or three polyisocyanates.

Irradiation-polymerizable components used can be all compounds which contain preferably one or more functional groups which are polymerizable by means of electron and/or UV radiation. Preference is given here to compounds containing olefinically unsaturated functional groups.

Particularly preferred are the derivatives of acrylic acid, of methacrylic acid, of crotonic acid and of maleic acid. These derivatives may contain preferably isocyanate-reactive groups such as hydroxyl groups, amine groups and mercapto groups. Examples of such compounds are 2-hydroxyethyl (meth)acrylate, 2-hydroxypropyl (meth)acrylate and 3-hydroxypropyl (meth)acrylate. They are obtained by reacting acrylic acid, for example, with diols.

Besides the irradiation-polymerizable compounds with isocyanate-reactive groups, it is also possible at least in part to use compounds of this kind without isocyanate-reactive groups. Examples of such are methyl (meth)acrylate, styrene, phenoxyethyl acrylate and the like.

With preference, however, it is also possible to use irradiation-curable compounds which have two or more UV-curable and/or electron-beam-curable groups per molecule. Examples of such are polyester acrylates, polyether acrylates and epoxy acrylates. These raw materials are available commercially from, for example, UCB under the Ebecryl name or from Rahn under the Genomer and Miramer names.

As a photoinitiator for the free-radical reaction it is possible with preference to employ compounds and compositions which, on irradiation with light having a wavelength of around 260 to around 480 nm, are capable of initiating a free-radical polymerization of olefinically unsaturated double bonds. Suitability is possessed in principle by all commercial photo-initiators which are compatible with the UV-reactive melt based on a moisture-crosslinking polyurethane, i.e. which produce at least largely homogeneous mixtures.

For example these are all substances exhibiting Norrish type I fragmentation. Examples thereof are benzophenone, camphorquinone, Quantacure (manufacturer: International Bio-Synthetics), Kayacure MBP (manufacturer: Nippon Kayaku), Esacure BO (manufacturer: Fratelli Lamberti), Trigonal 14 (manufacturer: Akzo), photoinitiators of the Irgacure™, Darocure™ or Speedcure™ series (manufacturer: Ciba-Geigy), Darocure™ 1173 and/or Fi-4 (manufacturer: Eastman). Particular suitability among these is possessed by Irgacure™ 651, Irgacure™ 369, Irgacure™ 184, Irgacure™ 907, Irgacure™ 1850, Irgacure™ 1173 (Darocure™ 1173), Irgacure™ 1116, Speedcure™ EDB, Speedcure™ ITX, Irgacure™ 784 or Irgacure™ 2959 or mixtures of two or more of these.

Preference is given to photoinitiators from the following group: benzoin and its derivatives, and also phenylhydroxyalkanone products and thioxanthone products.

It can be sensible, furthermore, to use additives in the melt in order to set or vary certain properties. These additives may be thermoplastic polymers such as ethylene-vinyl acetate (EVA), atactic polyolefins (APAO), and polyacrylates. It is also possible, furthermore, for there to be tackifying resins, waxes, plasticizers, fillers and matting agents, adjuvants, accelerants, adhesion promoters, pigments, catalysts, stabilizers and/or solvents. As stabilizers it is possible in particular to use the known light stabilizers and oxidation stabilizers and/or hydrolysis stabilizers.

The radiation-curable melt can be prepared by reacting at least one polyisocyanate with at least one polyol in a molar ratio of isocyanate groups to isocyanate-reactive groups of the polyols of 1.1:1 to 5:1.

The prepolymer A thus prepared has an NCO content of 0.5-20%.

Thereafter the irradiation-curable compound with isocyanate-reactive groups is reacted with the isocyanate-terminated prepolymer A. In this 2nd step it is also possible to add the initiator or initiators and, where appropriate, the compounds described above that contain no isocyanate-reactive groups, and also, where appropriate, additives such as stabilizers, fillers, etc.

The 2nd reaction is performed such that the composition of the reactive melt still contains 0.25-20%, preferably 0.5% to 10%, more preferably 1% to 5% of isocyanate, based on the overall composition.

In a second embodiment for the preparation at least one polyol is reacted with a first polyisocyanate in a molar ratio of the isocyanate groups to the isocyanate-reactive groups of the polyols of 5:1 to 1:5. In a second stage, reaction then takes place with a second polyisocyanate in such a way that the prepolymer B thus prepared has an NCO content of 0.5-20%.

Thereafter the irradiation-curable compound with isocyanate-reactive groups is reacted with the isocyanate-terminated prepolymer. In this 3rd step it is also possible to add the initiator or initiators and, where appropriate, the above-described irradiation-polymerizable compounds that contain no isocyanate-reactive groups, and also, where appropriate, adjuvants such as stabilizers, fillers, etc.

The reaction is performed such that the composition of the reactive melt still contains 0.25-20%, preferably 0.5% to 10%, more preferably 1% to 5% of isocyanate, based on the overall composition.

In a third embodiment for the preparation at least one polyol, the irradiation-curable compound with isocyanate-reactive groups, the initiator or initiators and, where appropriate, the above-described irradiation-polymerizable compounds that contain no isocyanate-reactive groups, and also, where appropriate, adjuvants such as stabilizers, fillers and the like, are mixed and reacted with at least one polyisocyanate.

This reaction is performed such that the composition of the reactive melt still contains 0.25-20%, preferably 0.5% to 10%, more preferably 1% to 5% of isocyanate, based on the overall composition.

In a fourth embodiment for the preparation at least one polyol, the irradiation-curable compound with isocyanate-reactive groups, the initiator or initiators and, where appropriate, the above-described irradiation-polymerizable compounds that contain no isocyanate-reactive groups, and also, where appropriate, adjuvants such as stabilizers, fillers and the like, are mixed and reacted with a first polyisocyanate in a molar ratio of the isocyanate groups to the isocyanate-reactive groups of the polyols of 5:1 to 1:5.

In a second step, reaction then takes place with a second polyisocyanate in such a way that the composition of the reactive melt still contains 0.25-20%, preferably 0.5% to 10%, more preferably 1% to 5% of isocyanate, based on the overall composition.

The total amount of irradiation-polymerizable components, relative to the overall composition of the reactive melt, ought to be 2-75%, preferably 5-50%. This total amount of irradiation-polymerizable components is composed of the compounds containing isocyanate-reactive groups and the compounds containing no isocyanate-reactive groups.

In order to achieve a position where further treatment of the article with at least partial sealing of the surface can take place as soon as possible, the irradiation typically takes place prior to complete curing of the melt layer. This gives the layer a partial strength which allows the said treatment. Full curing then takes place through the moisture crosslinking of the polyurethane.

Exposure preferably takes place within 24 hours after application of the melt layer. The exposure is preferably carried out in-line, i.e. directly after the application of the melt to the article.

Irradiation may take place with the aid of customary equipment. UV irradiation, for example, takes place using a UV lamp.

The method of the invention can be used to seal any of a very wide variety of article surfaces, or at least parts thereof, these articles likewise being provided by the present invention.

As well as the surfaces of elements for laminated or wood-block flooring, and also paneling elements, therefore, it can also be used to seal, for example, the surfaces of furniture or furniture parts and also veneers, at least partly. It should be stressed, however, that in principle the surface of any desired article can be sealed by the method of the invention, and that any article may have a sealing layer according to the invention.

The part of the surface of an article is preferably the entire surface of one outer face of the article, the sum of the fractions of the outer face and of the face opposite the outer face preferably making up essentially the entire outer face; with further preference the sum of the fractions is at least 75%, more preferably 90%, and with particular preference 95%.

Thus in the case of an article which extends substantially in two dimensions, such as an article in board format or a veneer, having two opposing faces which may be in parallel, and a surrounding edge, one face preferably forms the part of the surface according to the present invention.

The articles in question are preferably elements for laminated or wood-block flooring and also paneling elements or veneers, which are subject to particularly exacting requirements in respect of sealing. The articles may also be metal sheets.

The surface of the article that is to be sealed may be composed at least partly of wood or a wood-like material, such as a veneer or a fibreboard, for example, paper, metal, plastic and also mineral substances. With preference the surface is composed at least partly of wood, wood-like materials or plastics.

The present invention further provides for the use of a radiation-curable melt based on a moisture-crosslinking polyurethane for sealing at least part of the surface of an article.

The invention claimed is:

1. Method of sealing at least part of the surface of an article, comprising the steps of:
   first, providing an article comprising a laminated or wood-block flooring element, a paneling element, a veneer, a furniture element, a piece of furniture, or a metal sheet, then
   sealing at least part of an outer face surface of the article by
   (a) applying a layer of a radiation-curable melt based on a moisture-crosslinking polyurethane to said at least part of the outer face surface of the article, and
   (b) irradiating the melt layer.

2. Method according to claim 1, wherein the layer is applied using a roll, a doctor blade or a slot die or by spraying.

3. Method according to claim 1, wherein the surface of the melt layer is smoothed.

4. Method according to claim 1, wherein the melt layer is applied at a thickness in the range from 5 µm to 200 µm.

5. Method according to claim 1, wherein the melt layer is applied in a single ply.

6. Method according to claim 1, wherein the melt prior to curing contains not only at least one irradiation-polymerizable functional group but also NCO groups.

7. Method according to claim 1, wherein the melt prior to curing comprises acrylic acid derivatives, methacrylic acid derivatives or styrene derivatives.

8. Method according to claim 1, wherein the irradiation takes place prior to full curing of the melt layer through the moisture crosslinking of the polyurethane.

9. Method according to claim 1, wherein the irradiation takes place within 24 hours following application of the melt layer.

10. Method according to claim 1, wherein the melt prior to curing comprises:
   one or more polyisocyanates containing an average of two up to about four isocyanate groups;
   at least one polyol selected from the group consisting of polyesters, polyethers, polycarbonates, polyacetals, and mixtures of two or more thereof having a molecular weight of at least about 200 and having terminal hydroxyl groups; and
   an irradiation-polymerizable component selected from the group consisting of derivatives of acrylic acid, methacrylic acid, crotonic acid and maleic acid, wherein the derivative contains an isocyanate-reactive group selected from the group consisting of hydroxyl, amino and mercapto groups; methyl (meth)acrylate; styrene; phenoxyethyl acrylate; polyester acrylates; polyether acrylates; and epoxy acrylates.

11. Method according to claim 10, wherein the article that is to be sealed is composed at least partly of wood or a wood-like material and is a laminated or wood-block flooring element, a paneling element or a veneer, a furniture element or piece of furniture, and
   wherein at least 75% of an outer surface of the article is sealed to form an outer coated surface that is entirely exposed, and wherein the article is a laminated or wood-block flooring element, a paneling element or a veneer, a furniture element, piece of furniture, or a metal sheet.

12. Article having a sealing layer on at least part of its surface, comprising a layer of a radiation-curable melt based on a moisture-crosslinking polyurethane, wherein at least part of its surface is one outer face of the article and wherein the article is a laminated or wood-block flooring element, a paneling element or a veneer, a furniture element or a piece of furniture, or a metal sheet.

13. Article according to claim 12, wherein the melt layer has a thickness in the range from 5 µm to 200 µm.

14. Article according to claim 12, wherein the melt layer has been applied in a single ply.

15. Article according to claim 12, wherein the melt prior to curing contains not only at least one irradiation-polymerisable functional group but also NCO groups.

16. Article according to claim 12, wherein the melt prior to curing comprises acrylic acid derivatives, methacrylic acid derivatives or styrene derivatives.

17. Article according to claim 12, wherein the radiation curing of the melt layer has taken place prior to full curing of the reactive melt through the moisture crosslinking of the polyurethane.

\* \* \* \* \*